US011066933B2

(12) United States Patent
Brussk et al.

(10) Patent No.: US 11,066,933 B2
(45) Date of Patent: Jul. 20, 2021

(54) ROTOR SHAFT AND METHOD FOR PRODUCING A ROTOR SHAFT

(71) Applicant: Siemens Aktiengesellschaft, Munich (DE)

(72) Inventors: Stefan Brussk, Mülheim an der Ruhr (DE); Torsten-Ulf Kern, Wesel (DE); Alexander Luithle, Bochum (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 88 days.

(21) Appl. No.: 16/315,206

(22) PCT Filed: Jul. 7, 2017

(86) PCT No.: PCT/EP2017/067097
§ 371 (c)(1),
(2) Date: Jan. 4, 2019

(87) PCT Pub. No.: WO2018/011081
PCT Pub. Date: Jan. 18, 2018

(65) Prior Publication Data
US 2019/0309627 A1 Oct. 10, 2019

(30) Foreign Application Priority Data

Jul. 14, 2016 (EP) ..................... 16179383

(51) Int. Cl.
*F01D 5/06* (2006.01)
*B23K 9/02* (2006.01)
(Continued)

(52) U.S. Cl.
CPC .............. *F01D 5/063* (2013.01); *B23K 9/028* (2013.01); *B23K 9/0213* (2013.01); *B23K 9/167* (2013.01);
(Continued)

(58) Field of Classification Search
CPC ......... F01D 5/06; F01D 5/063; B23K 9/0213; B23K 15/0073; B23K 35/24
See application file for complete search history.

(56) References Cited

U.S. PATENT DOCUMENTS 4,633,554 A * 1/1987 Clark ................. H02K 15/0006
29/888
5,175,411 A * 12/1992 Barber ................. B23K 9/0358
219/137 R
(Continued)

FOREIGN PATENT DOCUMENTS

CN 88101320 A 9/1988
CN 1221802 A 7/1999
(Continued)

OTHER PUBLICATIONS

McNaughton, W.P., Richman, R.H. & Jaffee, R.I. "Superclean" 3.5NiCrMoV turbine rotor steel: A Status Report—Part II: Mechanical Properties. J. Mater. Eng. 13, 19-28 (1991). https://doi.org/10.1007/BF02834120 (Year: 1991).*
(Continued)

*Primary Examiner* — Richard A Edgar
*Assistant Examiner* — Jackson N Gillenwaters

(57) ABSTRACT

A rotor shaft for a turbine rotor of a turbine, in particular a steam turbine, having a shaft main body made of a first material and at least one ring which is made of a second material and is attached to the shaft main body, wherein the second material has equal or greater strength and/or greater corrosion resistance than the first material, wherein at least one blade slot is formed on the ring, and wherein the ring is materially bonded to the shaft main body by narrow-gap welding.

5 Claims, 2 Drawing Sheets

(51) Int. Cl.
*B23K 9/028* (2006.01)
*B23K 9/167* (2006.01)
*B23K 9/173* (2006.01)
*B23K 9/23* (2006.01)
*F01D 5/02* (2006.01)
*B23K 101/00* (2006.01)

(52) U.S. Cl.
CPC ............... *B23K 9/173* (2013.01); *B23K 9/23* (2013.01); *F01D 5/025* (2013.01); *B23K 2101/001* (2018.08); *F05D 2220/31* (2013.01); *F05D 2230/233* (2013.01); *F05D 2230/235* (2013.01); *F05D 2260/95* (2013.01)

(56) References Cited

U.S. PATENT DOCUMENTS

| | | | |
|---|---|---|---|
| 5,532,454 A | 7/1996 | Kuhnen | |
| 5,746,579 A * | 5/1998 | Amos | B23P 6/002 415/200 |
| 6,049,979 A * | 4/2000 | Nolan | B23K 9/0026 29/889.1 |
| 6,499,946 B1 * | 12/2002 | Yamada | C22C 38/22 415/199.4 |
| 8,523,519 B2 | 9/2013 | Breitenbach et al. | |
| 8,961,144 B2 * | 2/2015 | Ganesh | F01D 5/063 416/244 A |
| 2002/0141897 A1 | 10/2002 | Ernst et al. | |
| 2006/0201915 A1 * | 9/2006 | Obana | B23K 9/0213 219/76.1 |
| 2009/0001142 A1 | 1/2009 | Ballal et al. | |
| 2009/0113999 A1 | 5/2009 | Gerstler et al. | |
| 2009/0214345 A1 | 8/2009 | DeMania et al. | |
| 2010/0202891 A1 | 8/2010 | Nishimoto et al. | |
| 2010/0329849 A1 * | 12/2010 | Nishioka | F01D 5/081 415/115 |

FOREIGN PATENT DOCUMENTS

| | | |
|---|---|---|
| CN | 101270777 A | 9/2008 |
| CN | 101772622 A | 7/2010 |
| CN | 102031460 A | 4/2011 |
| CN | 103437829 A | 12/2013 |
| CN | 103722266 A | 4/2014 |
| CN | 105364247 A | 3/2016 |
| DE | 102009039824 A1 | 3/2011 |
| EP | 1574665 A1 | 9/2005 |
| EP | 1739202 A1 | 1/2007 |
| EP | 2473709 A2 | 7/2012 |
| EP | 2612721 A1 | 7/2013 |
| EP | 2669472 A1 | 12/2013 |
| EP | 3072624 A | 9/2016 |
| JP | S5825459 A | 2/1983 |
| JP | S6163385 A | 4/1986 |
| JP | S61235543 A | 10/1986 |
| JP | S6234671 A | 2/1987 |
| JP | S6371502 A | 3/1988 |
| JP | H07214308 A | 8/1995 |
| JP | 2003211288 A | 7/2003 |

OTHER PUBLICATIONS

Gunzelmann et al.: "Engspaltschweissen—Ein Prinzip für drei Verfahren", Schweissen Und Schneiden 60 (2008) Heft 5, XP055329407, Gefunden im Internet: URL:http://www.isoarc.ch/info-datenbank/pdf/Engsspaltschweissung.pdf; 2009; "Narrow Gap Welding—A Principle for Three Processes" with English Machine Translation of Abstract.

PCT International Search Report and Written Opinion of International Searching Authority dated Sep. 10, 2017 corresponding to PCT International Application No. PCT/EP2017/067097 filed Jul. 7, 2017.

EP search report dated Dec. 23, 2016 for corresponding EP patent application No. 16179383.1.

* cited by examiner

ROTOR SHAFT AND METHOD FOR PRODUCING A ROTOR SHAFT

CROSS REFERENCE TO RELATED APPLICATIONS

This application is the U.S. National Stage of International Application No. PCT/EP2017/067097 filed Jul. 7, 2017, and claims the benefit thereof. The International Application claims the benefit of European Application No. EP16179383 filed Jul. 14, 2016. All of the applications are incorporated by reference herein in their entirety.

FIELD OF INVENTION

The invention relates to a rotor shaft for a turbine rotor of a turbine, in particular a steam turbine.

The invention further relates to a method for producing a rotor shaft of a turbine rotor of a turbine, in particular a steam turbine.

BACKGROUND OF INVENTION

A steam turbine comprises a rotatably supported turbine rotor which has a rotor shaft, on which a plurality of rows of rotor blades are arranged with axial spacing from each other. The rotor blades each comprise a rotor blade root which is inserted in a blade groove associated with the respective rotor blade row in the rotor shaft for fixing the respective rotor blade to the rotor shaft. To this end, the rotor blade root generally has a root portion which is constructed in the manner of a fir tree in cross-section, wherein the blade groove is constructed in terms of cross-section so as to complement the root portion.

Turbine rotors of steam turbines, in particular low-pressure steam turbines, are subjected during operation of a steam turbine to different stresses. For example, very high tensile stresses occur in the blade grooves of the axially external rows of blades. Furthermore, corrosion stresses occur as a result of the humid vapor which flows through the steam turbine and may promote stress crack corrosion in highly loaded regions of the turbine rotor.

Additionally, it is important to ensure an ability to produce monolithic rotor shafts in the form of monoblocs or shaft modules which can be connected to each other in order to form rotor shafts with the necessary dimensions with the corresponding technical material properties. The material selection for a complete rotor shaft or for shaft modules therefore follows primarily the requirements of the most highly stressed region of the rotor shaft. Such a region should be produced using a material which is as high-grade as possible but which is therefore also cost-intensive. Regions of the rotor shaft or the shaft modules which are stressed to a lesser extent do not require the use of such a high-grade material. Therefore, the material selection for a complete rotor shaft or for shaft modules usually constitutes a compromise between a more cost-intensive material and a less cost-intensive material which is adapted to the respective requirements.

Currently, rotor shafts are produced from one piece as a monobloc or from disk-like or cylindrical shaft modules which are welded together. Typical materials for a low-pressure rotor range are (2.8-3.5)NiCrMoV steels or also 1CrMoV steel or 2CrMoWV steel. Such steels are used for combined medium-pressure/low-pressure rotor shafts but are subjected to limitations in the achievable properties as a function of the rotor shaft diameter.

A 3.5NiCrMoV steel provides the highest strengths with the best toughness levels. As a result of the great mass and the large diameter of the respective monobloc or shaft module, however, these materials also come up against the limits of the achievable strengths thereof and the homogeneity over the cross-section of the monobloc or shaft module as a result of the used technical production manufacturing methods, such as, for example, forging and heat treatment for through-quenching. An additional expansion stage of 3.5NiCrMoV rotor shaft material is the "Superclean" variant but it is substantially more cost-intensive (approximately from 10 to 20%) as a result of the necessary purity and the increased production complexity. A limiting factor is further the limited supplier base for this material.

When long-term operationally stressed low-pressure rotor shafts or rotor shafts which have cracks in the blade grooves of the axially external blade row steps are re-worked, it is currently impossible to strengthen or re-contour corrosion-stressed rotor shafts with respect to a static strength, an oscillation strength (Low Cycle Fatigue), a cyclical flow curve and a freedom from defects with the originally configured properties of the 3.5NiCrMoV material. The very cost-intensive possibility of build-up welding of entire steps of blade grooves does not provide the usual properties of the forged material and involves the risk of welding defects. In this case, there remains either only further operation until critical crack depths are reached or the entire replacement of the forged rotor shaft component.

SUMMARY OF INVENTION

An object of the invention is to provide a rotor shaft for a turbine rotor of a turbine, whose properties are individually adapted to the respective requirements in a cost-effective manner.

This object is achieved by the independent patent claims. Advantageous embodiments are set out in the following description, the dependent patent claims and the Figures which may constitute a developed, in particular also advantageous, aspect of the invention, individually per se or in any combination of at least two embodiments with each other.

A rotor shaft according to the invention for a turbine rotor of a turbine, in particular a steam turbine, comprises a shaft base member comprising a first material and at least one ring which is applied to the shaft base member and which comprises a second material, wherein the second material has an identical strength or higher strength and/or a higher corrosion resistance than the first material, wherein at least one blade groove is formed in the ring and wherein the ring is connected to the shaft base member by means of narrow-gap welding in a materially integral manner.

According to the invention properties of the rotor shaft can be adapted to the respective requirements and occurrences of loads partially, in particular in a low-pressure range, for example, in the range of the axially external blade grooves, by there being arranged on the shaft base member at least one ring, the material properties of which differ from the material properties of the shaft base member and are particularly optimized with regard to higher mechanical and/or corrosive loads. In particular, the material properties of the ring can be optimized substantially independently of the material properties of the shaft base member with respect to mechanical and/or corrosive properties. Since the use of a highly resistant and/or more corrosion-resistant and therefore generally more cost-intensive second material is limited to the ring, the shaft base member can be optimized and where applicable produced from a more cost-effective first material, which can be linked with a cost reduction in comparison with the conventional monobloc production. The use according to the invention of the more corrosion-withstanding or more corrosion-resistant and/or stronger second material is particularly advantageous in the field of blade grooves of turbines with a high proportion of humidity in the low-pressure discharge.

According to the invention the ring can be used to form the cold low-pressure end blade grooves with material properties which are adapted to the respective application. To this end, the ring is fixed by means of narrow-gap welding to the periphery of the shaft base member in a materially engaging manner. The ring allows the material of the rotor shaft to be adapted in the region of the rotor groove which is formed in the ring to the respective requirements, for example, to a high static strength, an optimum LCF behavior and/or a high level of corrosion resistance.

As a result of the smaller volume or the smaller cross-section of the ring, it can be produced using conventional forging methods or rolling methods more homogeneously and with higher levels of strength, for example, with a structure having a finer grain, a better degree of purity, improved LCF properties and the like, which is not possible in the case of a conventional monobloc or shaft module as a result of the production method used therefor and physical peripheral conditions.

As a result of the invention, a radial gradient of the material properties on the rotor shaft can be generated in the region of the ring. For example, a gradient can be produced from the surface of the rotor shaft to the longitudinal center axis of the rotor shaft. It is also possible to construct medium-pressure/low-pressure rotor shafts or high-pressure/medium-pressure/low-pressure rotor shafts as a monobloc comprising (1-2)CrMoV and for the claw material of the $0^{th}$ blade row to be applied as a ring.

The application according to the invention of at least one ring to the shaft base member further affords the possibility of standardizing rotor shafts by rings which have different thicknesses and/or widths being applied to a uniformly dimensioned shaft base member depending on the application for the respective final stage size.

The shaft base member can be produced in the course of a new production operation. Alternatively, the shaft base member can be formed by a processing operation, in particular by turning, of an already-present, in particular used, rotor shaft, wherein a portion which has to be repaired and in which a damaged blade groove is formed is eroded. In the case of the repair of an already-used rotor shaft which has cracks, it can be re-contoured by applying the ring to the shaft base member which is produced by processing the rotor shaft. The shaft base member can be produced as a monobloc or from shaft modules which are welded to each other. The ring has at least the same properties as the original rotor shaft in comparison with build-up welding. Consequently, it is possible to repair corrosively damaged or cracked blade grooves of a conventional rotor shaft in a cost-effective manner.

The rotor shaft according to the invention may also have two or more rings which are applied accordingly to the shaft base member and on which at least one blade groove is formed, respectively.

The ring is advantageously connected to the shaft base member via at least one weld seam which is produced by means of narrow-gap welding, wherein the weld seam has axially external outer portions comprising a first welding material and a central portion which is located between the outer portions and which comprises a second welding material, and wherein the first welding material has a higher corrosion resistance than the second welding material. Accordingly, a weld seam root comprising the first welding material can initially be produced and forms an outer portion of the weld seam. Subsequently, the central portion of the weld seam can be produced using the second welding material. Finally, a covering layer comprising the first welding material can be produced and forms the other outer portion of the weld seam. The second welding material may have a higher strength than the first welding material. Consequently, in this embodiment of the rotor shaft it is possible to generate an axial gradient of the weld seam properties which meets requirements. The weld seam may extend radially as far as a depth of the rotor shaft or a corresponding depth range which is subjected to lower loads. The weld seam can be examined from a radial position without being destroyed, for example, by means of ultrasound, because a favorable orientation of the sound beam is provided for possible indications in the weld seam (for example, flank fusion defects).

The ring is advantageously composed of: 0.10-0.30% by weight C, 1.0-6.0% by weight Cr, 3.0-6.0% by weight Ni.

The ring is advantageously produced by rolling or forging. In particular, the ring can be produced by ring rolling.

The rotor shaft advantageously comprises at least two rings which are arranged so as to be offset toward a shaft end of the shaft base member and which are applied to the shaft base member, wherein an outer diameter of an application portion of the shaft base member, which portion is arranged nearer the shaft end and carries a ring, is smaller than an outer diameter of an application portion of the shaft base member, which portion is arranged further away from the shaft end and carries the other ring. Accordingly, an inner diameter of the ring which is applied to the application portion arranged nearer the shaft end is smaller than an inner diameter of the ring which is applied to the application portion arranged further away from the shaft end. It is thereby ensured that the ring with the larger inner diameter can be fitted on the shaft base member at a greater distance from the shaft end.

A method according to the invention for producing a rotor shaft of a turbine rotor of a turbine, in particular a steam turbine, comprises the steps of:—producing a shaft base member from a first material;—producing at least one ring from a second material, wherein the second material has an identical strength or higher strength and/or a higher corrosion resistance than the first material;—applying the ring to the shaft base member;—connecting the ring to the shaft base member by means of narrow-gap welding in a materially integral manner; and—forming at least one blade groove in the ring.

The advantages mentioned above with respect to the rotor shaft are accordingly connected with the method. In particular, the rotor shaft can be produced according to one of the above-mentioned embodiments or any combination of at least two of these embodiments with each other using the method. The narrow-gap welding can be carried out with the shaft base member being orientated vertically and in a PA welding position or with the shaft base member being orientated horizontally and in a PC welding position. During the narrow-gap welding, the ring can be supported by means of a rollerway.

Before welding, the ring is advantageously subjected to a heat treatment at a temperature between 550° C. and 630° C. After welding the ring, the rotor shaft is advantageously subjected to a heat treatment at a temperature between 580° C. and 650° C.

The ring is advantageously connected in a materially integral manner to the shaft base member via at least one weld seam which is produced by means of narrow-gap welding, wherein the weld seam is produced in such a manner that the weld seam has axially external outer portions comprising a first welding material and a central portion which is located between the outer portions and which comprises a second welding material, wherein the first welding material has a higher corrosion resistance than the second welding material. The advantages mentioned above with respect to the corresponding embodiment of the rotor shaft are accordingly connected with this embodiment.

A weld seam root of the weld seam is advantageously formed at least partially outside a gap between the ring and the shaft base member. The weld seam root is thereby partially or completely arranged outside the production contour of the rotor shaft. By subsequently eroding the axial weld seam ends and consequently at least partially the weld seam root, homogeneous mechanical properties are produced along the weld seam.

The narrow-gap welding is advantageously carried out using electron beam welding. The electron beam welding is advantageously carried out under a reduced vacuum. Alternatively, the narrow-gap welding can be carried out using WIG welding or MAG welding.

The narrow-gap welding is advantageously carried out from a side which faces a shaft end of the shaft base member arranged nearest the ring. In particular, the ring can be welded from the connection side of the shaft base member nearer the ring in one operation with the shaft base member.

The ring is advantageously orientated coaxially with respect to the shaft base member before the narrow-gap welding via at least one centering means. In particular, the root region can be provided with a suitable centering. Where applicable, a temporary shrink-fit connection may be used.

Preferably, at least the ring is subjected to subsequent heat treatment after the narrow-gap welding is completed. As a result of this local subsequent heat treatment, a selective adjustment of mechanical properties of the ring is possible. The heat treatment state of the ring is selected in this instance so that it has the necessary mechanical properties after the subsequent heat treatment at which a heat treatment of the weld connection can also be carried out.

The ring is advantageously produced by rolling or forging.

The ring is advantageously produced so as to have a width which is greater than a desired width of the ring, wherein the width of the ring is reduced to the desired width by eroding material after completion of the narrow-gap welding and after an examination of the ring. The initially produced width of the ring is consequently greater than the finished contour of the rotor shaft which is desired in this region. Following the examination of the ring after a heat treatment, the material regions of the ring which differ from the finished contour of the rotor shaft can be eroded in order to reduce the ring to the desired width.

At least two rings are advantageously applied to the shaft base member so as to be offset toward a shaft end of the shaft base member, wherein the shaft base member is produced in such a manner that an outer diameter of an application portion of the shaft base member, which portion is arranged nearer the shaft end and carries a ring, is smaller than an outer diameter of an application portion of the shaft base member, which portion is arranged further away from the shaft end and carries the other ring. The advantages mentioned above with respect to the corresponding embodiment of the rotor shaft are accordingly connected with this embodiment.

BRIEF DESCRIPTION OF THE DRAWINGS

The invention is explained below by way of example with reference to an embodiment and the appended Figures, wherein the features set out below may constitute a developed or advantageous aspect of the invention both individually per se and in any combination with each other. In the drawings.

DETAILED DESCRIPTION OF INVENTION

Figure 1:
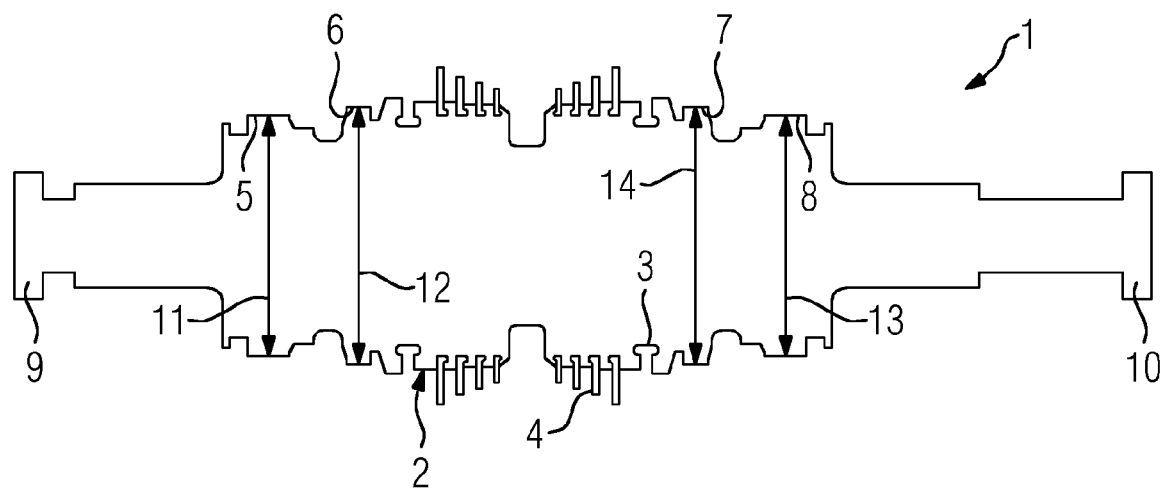
FIG. 1 is a schematic longitudinal section through an embodiment of a rotor shaft according to the invention in an initial production state.

FIG. 1 is a schematic longitudinal section through an embodiment of a rotor shaft 1 according to the invention for a turbine rotor of a turbine in an initial production state.

The rotor shaft 1 comprises a shaft base member 2 comprising a first material. There are formed on the shaft base member 2 a plurality of circumferential blade grooves 3 which are axially spaced apart from each other. Short rotor blades 4 are arranged on central blade grooves 3.

Four application portions 5 to 8 are formed on the shaft base member 2, wherein the application portions 5 and 6 are arranged nearer the shaft end 9 of the shaft base member 2 as shown on the left and the application portions 7 and 8 are arranged nearer the shaft end 10 of the shaft base member 2 as shown on the right. An outer diameter 11 of the application portion 5 which is arranged nearer the shaft end 9 is smaller than an outer diameter 12 of the application portion 6 which is arranged further away from the shaft end 9. An outer diameter 13 of the application portion 8 which is arranged nearer the shaft end 10 is smaller than an outer diameter 14 of the application portion 7 which is arranged further away from the shaft end 10. The outer diameters 11 and 13 or 12 and 14 may be identical or different. The application portions 5 to 8 can be formed when the new shaft base member 2 is produced or by processing a conventional rotor shaft by a radially externally provided material portion, which is not shown and on which a damaged blade groove is formed, with respect to the respective application portion 5, 6, 7 and 8 being removed by erosion in order to repair the conventional rotor shaft. Four rings are arranged on the shaft base member 2, as shown in FIGS. 2 and 3 and as described below.

Figure 2:
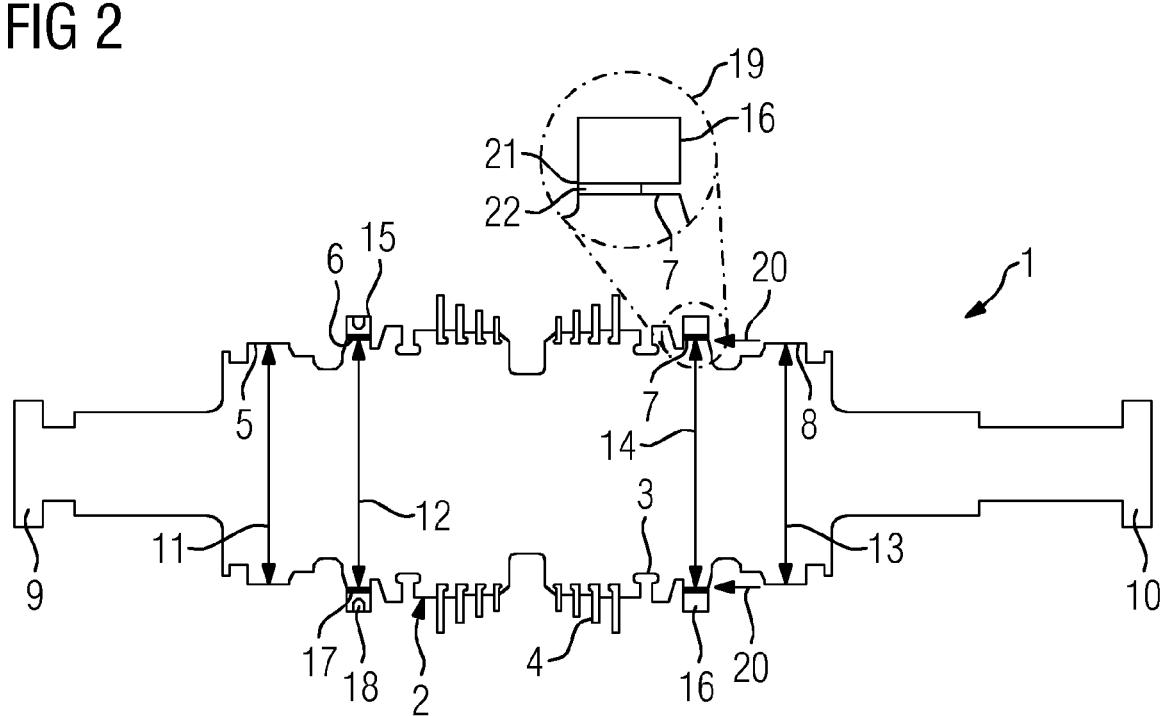
FIG. 2 is a schematic longitudinal section through the rotor shaft shown in FIG. 1 in an additional production state.
Figure 3:
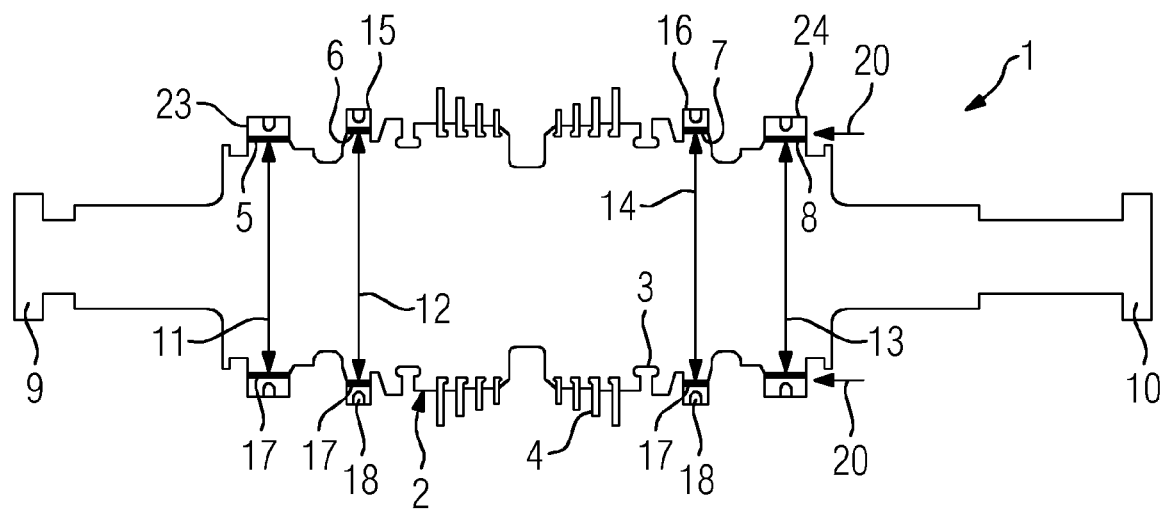
FIG. 3 is a schematic longitudinal section through the rotor shaft shown in FIG. 1 in an additional production state.

FIG. 2 is a schematic longitudinal section through the rotor shaft 1 shown in FIG. 1 in another production state. This production state differs from the production state shown in FIG. 1 in that two rings 15 and 16 comprising a second material have been applied to the shaft base member 2, wherein the second material has an identical or higher strength and/or a higher corrosion resistance than the first material. Each ring 15 or 16 is produced by rolling or forging.

The ring 15 is already connected to the shaft base member 2 in a materially integral manner by means of narrow-gap welding. In particular, the ring 15 is connected to the shaft base member 2 via a weld seam 17 which is produced by means of narrow-gap welding. The weld seam 17 may have axially external outer portions (not shown) which comprise a first welding material and a central portion which is not shown and which is located between the outer portions and which comprises a second welding material, wherein the first welding material has a higher corrosion resistance than the second welding material. The narrow-gap welding can be carried out using electron beam welding or WIG welding or MAG welding. At least one blade groove 18 is formed on the ring 15 in order to arrange a rotor blade row which is not shown.

The ring 16 is not yet connected to the shaft base member 2 or the application portion 7 by means of narrow-gap welding in a materially integral manner. This can be seen particularly in the enlarged detail 19. The enlarged detail 19 shows that the ring 16 is orientated before the narrow-gap welding coaxially with respect to the shaft base member 2 via a centering means. The centering means comprises a shoulder 21 which is formed on the ring 16 and which is directed in the direction of the application portion 7 which radially contacts a projection 22 which is formed on the application portion 7 and which is directed in the direction of the ring 16. The shoulder 21 and the projection 22 are arranged on an end of the ring 16 or application portion 7 which faces away from the shaft end 10. The narrow-gap welding is carried out in accordance with the arrows 20 from a side which faces the shaft end 10 of the shaft base member 2 arranged nearest the ring 16.

The rings 15 and 16 can be subjected to a subsequent heat treatment after the conclusion of the respective narrow-gap welding. Each ring 15 or 16 can be produced so as to have a width which is greater than a desired width of the ring 15 or 16, wherein the width of the ring 15 or 16 is reduced to the desired width by material erosion after the conclusion of the narrow-gap welding and after an examination of the ring 15 or 16, respectively.

FIG. 3 is a schematic longitudinal section through the rotor shaft 1 shown in FIG. 1 in another production state. This production state differs from the production state shown in FIG. 2 in that two additional rings 23 and 24 comprising a second material have been applied to the shaft base member 2, wherein the second material has an identical or higher strength and/or a higher corrosion resistance than the first material. Furthermore, a blade groove 18 is also formed in the ring 16. Each ring 23 or 24 is produced by rolling or forging.

The rings 23 and 24 are connected to the shaft base member 2 in a materially integral manner by means of narrow-gap welding. In particular, each ring 23 or 24 is connected to the shaft base member 2 by means of a weld seam 17 which is produced by means of narrow-gap welding. Each weld seam 17 may have axially external outer portions (not shown) comprising a first welding material and a central portion (not shown) which is located between the outer portions and which comprises a second welding material, wherein the first welding material has a higher corrosion resistance than the second welding material. The narrow-gap welding can be carried out using electron beam welding or WIG welding or MAG welding. The narrow-gap welding is carried out in accordance with the arrows 20 from a side which faces the shaft end 9 or 10 of the shaft base member 2 arranged nearest the ring 23 or 24, respectively. A blade groove 18 is formed in the rings 23 and 24 in order to arrange a rotor blade row which is not shown.

The rings 23 and 24 can be subjected to subsequent heat treatment after the narrow-gap welding is completed. Each ring 23 or 24 can be produced so as to have a width which is greater than a desired width of the ring 23 or 24, wherein the width of the ring 23 or 24 is reduced to the desired width by material erosion after the conclusion of the narrow-gap welding and after an examination of the ring 23 or 24, respectively.

Consequently, the rotor shaft 1 comprises two rings 15 and 23 which are arranged so as to be offset toward the shaft end 9 of the shaft base member 2 and which are applied to the shaft base member 2 and two rings 16 and 24 which are arranged so as to be offset toward the shaft end 10 of the shaft base member 2 and which are applied to the shaft base member 2.

The ring 15, 16, 23, 24 is constructed as a steel ring with a higher Ni content having a composition of from 0.10 to 0.30% by weight C, from 1.0 to 6.0% by weight Cr, from 3.0 to 6.0% by weight Ni.

The strength of the ring 15, 16, 23, 24 and of the connection can be adjusted in a two-step process, wherein the temperatures of the first step are T1 and the temperatures of the second step are T2, where T1<T2.

In the second step, a PWHT which is an integral component of the adjustment of the LCF properties in the welded-on ring is carried out. In the first step, a quality heat treatment of the ring is carried out. In the second step, a (PWHT) heat treatment of the base member is carried out with the ring applied after the welding operation. The temperatures in the first step are T1=from 550° C. to 630° C. The temperatures of the second step are T2=from 580° C. to 650° C.

The sequence of the heat treatment produces: a) a vertically adjustable strength in the ring with respect to the shaft base member and therefore better LCF properties, b) sufficiently tempered thermal influence zones in the shaft base material and in the ring in order to prevent both metallurgical notches and susceptibility to stress crack corrosion SCC.

Although the invention has been illustrated and described in greater detail by the embodiment, the invention is not limited by the example disclosed and other variants can be derived therefrom by the person skilled in the art without departing from the protective scope of the invention.

The invention claimed is:

1. A rotor shaft for a turbine rotor of a turbine or a steam turbine, comprising:
   a shaft base member comprising a first material and at least one ring which is applied to the shaft base member and which comprises a second material, wherein the second material comprises at least one of an identical strength, a higher strength, and a higher corrosion resistance than the first material,
   wherein at least one blade groove is formed in the at least one ring and wherein the at least one ring is connected to the shaft base member by narrow-gap welding in a materially integral manner,
   wherein the at least one ring comprises a composition of 0.10-0.30% by weight C, 1.0-6.0% by weight Cr, 3.0-6.0% by weight Ni,
   wherein the at least one ring is connected to the shaft base member via at least one weld seam which is produced by the narrow-gap welding,
   wherein the at least one weld seam comprises axially external outer portions comprising a first welding material and a central portion which is located between the axially external outer portions and which comprises a second welding material, and
   wherein the first welding material comprises a higher corrosion resistance than the second welding material.

2. The rotor shaft as claimed in claim 1, wherein the at least one ring is produced by rolling or forging.

3. The rotor shaft as claimed in claim 1,
wherein the at least one ring comprises at least two rings which are arranged so as to be offset toward a shaft end of the shaft base member and which are applied to the shaft base member, and
wherein an outer diameter of an application portion of the shaft base member, which portion is arranged nearer the shaft end and carries a first ring of the at least two rings, is smaller than an outer diameter of an application portion of the shaft base member, which portion is arranged further away from the shaft end and carries a second ring of the at least two rings.

4. The rotor shaft as claimed in claim 1, wherein the at least one ring is connected to the shaft base member via a weld seam that has been eroded back to a production contour of the shaft base member.

5. A rotor shaft for a turbine rotor of a turbine or a steam turbine, comprising:

a shaft base member comprising a first material and at least one ring which is applied to the shaft base member and which comprises a second material, wherein the second material comprises at least one of an identical strength, a higher strength, and a higher corrosion resistance than the first material, wherein at least one blade groove is formed in the at least one ring and wherein the at least one ring is connected to the shaft base member by narrow-gap welding in a materially integral manner, wherein the at least one ring comprises a composition of 0.10-0.30% by weight C, 1.0-6.0% by weight Cr, 3.0-6.0% by weight Ni, wherein the ring comprises a shoulder and the shaft base member comprises a projection that cooperates with the shoulder to center the ring on the shaft base member, wherein the shoulder and the projection are disposed closer to an end of the at least one ring which faces away from a nearest end of the shaft base member than to an opposite end of the at least one ring.

* * * * *